(12) United States Patent
Aguilar et al.

(10) Patent No.: US 6,785,807 B1
(45) Date of Patent: Aug. 31, 2004

(54) METHOD AND SYSTEM FOR PROVIDING BOOTCODE SUPPORT IN A DATA PROCESSING SYSTEM THAT USES A COMMUNICATIONS PORT THAT UTILIZES A FIRST COMMUNICATIONS PROTOCOL, AN EXTERNAL DEVICE THAT UTILIZES A SECOND COMMUNICATIONS PROTOCOL, AND A DEVICE DRIVER THAT IS LOADED IN RESPONSE TO BOOTING TO COMMUNICATE WITH THE EXTERNAL DEVICE THROUGH THE COMMUNICATIONS PORT

(75) Inventors: Maximino Aguilar, Austin, TX (US); Sanjay Gupta, Austin, TX (US); James Michael Stafford, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/519,339

(22) Filed: Mar. 6, 2000

(51) Int. Cl.⁷ .................... G06F 15/177; G06F 9/00; G06F 15/00; G06F 13/12; G06F 11/00
(52) U.S. Cl. ................ 713/2; 713/1; 712/32; 710/63; 714/25
(58) Field of Search ............... 717/11; 710/73, 710/8, 302, 63; 713/2, 100, 200, 1; 395/652; 709/222; 712/32; 714/25; 345/156

(56) References Cited

U.S. PATENT DOCUMENTS

| | | | | |
|---|---|---|---|---|
| 5,675,795 A | * | 10/1997 | Rawson et al. | 713/2 |
| 5,715,456 A | | 2/1998 | Bennett et al. | 395/652 |
| 5,978,912 A | * | 11/1999 | Rakavy et al. | 713/2 |
| 6,367,074 B1 | * | 4/2002 | Bates et al. | 711/170 |
| 6,463,530 B1 | * | 10/2002 | Sposato | 713/2 |
| 6,477,642 B1 | * | 11/2002 | Lupo | 713/2 |
| 6,480,914 B1 | * | 11/2002 | Hsieh | 710/73 |
| 6,567,875 B1 | * | 5/2003 | Williams et al. | 710/302 |
| 6,591,358 B2 | * | 7/2003 | Jaffrey | 712/32 |
| 6,598,095 B2 | * | 7/2003 | Peterson | 710/8 |

* cited by examiner

Primary Examiner—Thomas Lee
Assistant Examiner—Chi Whan Chung
(74) Attorney, Agent, or Firm—Daniel E. McConnell; Dillon & Yudell, LLP

(57) ABSTRACT

A data processing system with bootcode support for communicating with a noncompliant external device has a motherboard, non-volatile memory connected to the motherboard, a volatile memory, processing resources, a communications port that utilizes a first communications protocol, and one or more buses interconnecting those components. Startup instructions obtained from the non-volatile memory load a device driver for the external device from the non-volatile memory into the volatile memory. However, unlike the communications port, the external device utilizes a second communications protocol. Diagnostic instructions then utilize the device driver to communicate with the external device via the communications port. In an illustrative embodiment, the communications port is a USB port, the external device is a serial terminal, the device driver is a serial terminal driver, and the diagnostic instructions utilize the serial terminal driver to communicate with the serial terminal via the USB port while no operating system is present in the volatile memory.

24 Claims, 4 Drawing Sheets

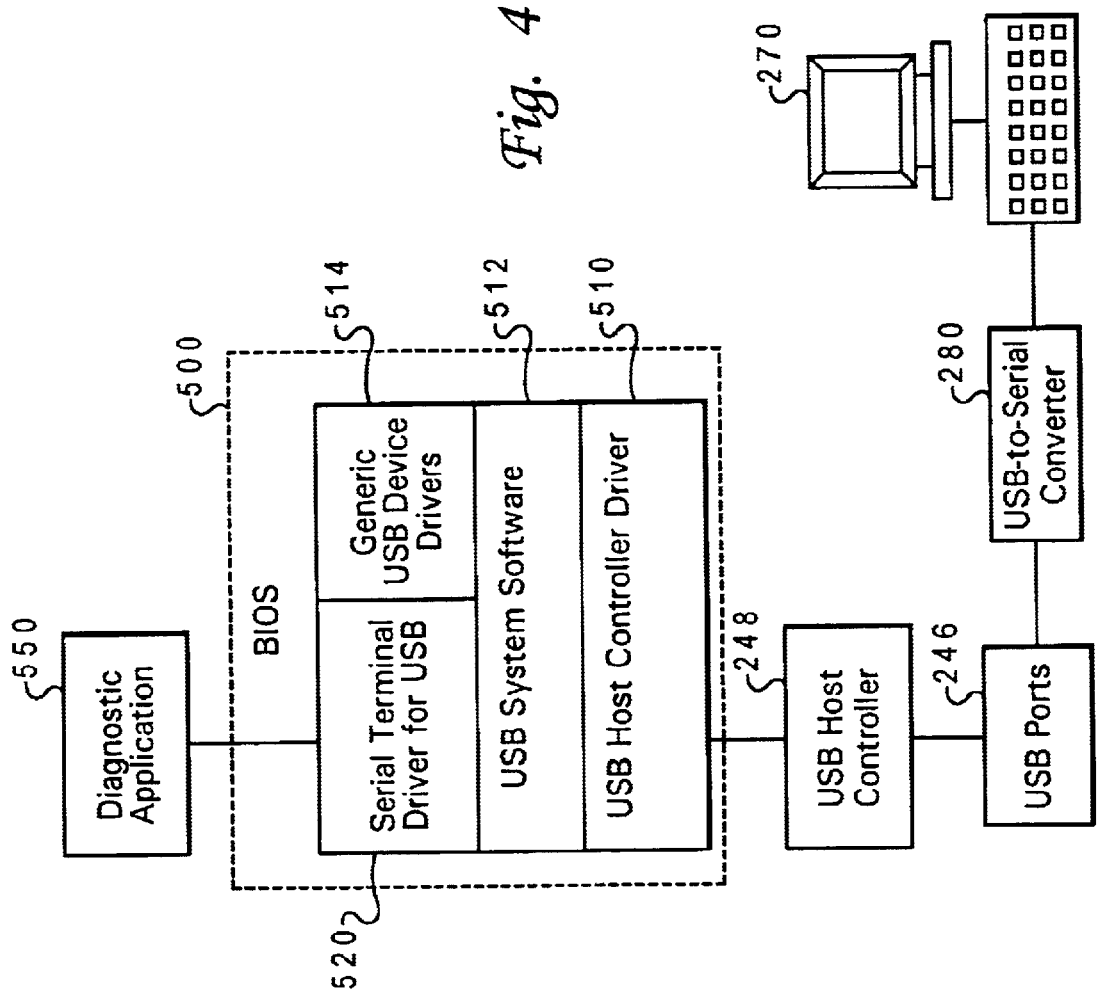

METHOD AND SYSTEM FOR PROVIDING BOOTCODE SUPPORT IN A DATA PROCESSING SYSTEM THAT USES A COMMUNICATIONS PORT THAT UTILIZES A FIRST COMMUNICATIONS PROTOCOL, AN EXTERNAL DEVICE THAT UTILIZES A SECOND COMMUNICATIONS PROTOCOL, AND A DEVICE DRIVER THAT IS LOADED IN RESPONSE TO BOOTING TO COMMUNICATE WITH THE EXTERNAL DEVICE THROUGH THE COMMUNICATIONS PORT

BACKGROUND OF THE INVENTION

1. Technical Field

The present invention relates to data processing systems and, in particular, to methods and systems for configuring data processing systems. More specifically, the present invention relates to systems and methods with bootcode support for operator interaction.

2. Description of the Related Art

Conventional personal computer systems (PCs) include a central processing unit (CPU), one or more memory modules, and a motherboard into which the CPU and memory modules are inserted. A chipset mounted to the motherboard by the manufacturer provides core logic that operatively links the CPU, the memory modules, and other components of the system. A read only memory (ROM) chip containing the system's startup program (firmware) is also mounted to the motherboard.

A conventional PC typically also includes input and output (I/O) devices (e.g., a keyboard and a video display), as well as one or more floppy and/or hard disk drives, which are also connected to the motherboard, oftentimes via intermediate adapters. Most general-purpose PCs in operation today also include a dedicated serial port, a dedicated keyboard port, and one or more expansion slots configured to receive expansion cards for augmenting the PC's functionality. For example, a network expansion card can be inserted into an expansion slot of a general-purpose PC to provide a port for connecting that PC to a local area network (LAN).

When a PC is started, the CPU automatically executes the startup program, which loads and activates a basic input and output system (BIOS) that supports communication between the CPU and the I/O devices. The startup program then loads and activates an operating system (OS) which provides an interface to the hardware of the PC for software applications such as network client software, word processors, web browsers, etc.

Some OSs (such as DOS) provide a relatively simple and limited set of commands for utilizing the PC's hardware. Perhaps the most widely utilized variety of DOS is the OS that has been distributed (in numerous versions) since approximately 1980 by Microsoft Corporation under the trademark MS-DOS. An important characteristics of DOS is that it can operate within systems having relatively limited data storage facilities. Other OSs provide more complex functionality, such as support for networking, security, and/or multi-tasking. However, relative to DOS, these more advanced OSs also require additional hardware resources, particularly the data storage facilities utilized to hold the OS while the system is powered down and the data storage facilities utilized by the OS when the system is active. Examples of such advanced OSs include the OS developed by American Telephone and Telegraph Company and distributed under the trademark UNIX, the OS distributed by International Business Machines Corporation (IBM) under the trademark AIX, other "UNIX-like" OSs, the OS distributed by IBM under the trademark OS/2, and the OSs distributed by Microsoft Corporation under the trademarks WINDOWS 95, WINDOWS 98, and WINDOWS NT.

While a general purpose PC may be customized to fill particular computing needs, advances in technology and changes in the computer market have resulted in the development of special-purpose PCs that differ in configuration from general-purpose PCs. For example, in response to demand for PCs to serve solely as network clients, manufacturers have recently begun producing PCs with motherboards having built-in, or "onboard," networking circuitry. Further, in order to reduce the complexity and cost of such PCs, and to make room on the motherboard for the necessary onboard components, manufacturers are omitting from those PCs legacy features such as expansion slots and disk drives. These PCs, which are called "thin clients," "diskless workstations," "network appliances," or "Internet appliances," may even lack dedicated keyboard and serial ports, instead utilizing one or more Universal Serial Bus (USB) ports. As explained in the Universal Serial Bus Specification Revision 1.1, which may be found on the Internet at http://www.usb.org and which is hereby incorporated by reference, USB ports employ two data lines that carry data as complementary voltage signals.

Furthermore, unlike a typical general purpose PC, which loads an operating system from a local hard disk (or other local data storage), when some thin clients are started or restarted (i.e., booted) they automatically load the OS from a remote server. Furthermore, thin clients often do not load DOS but instead load some other OS (e.g., a UNIX-like OS).

Although it can be appreciated that thin clients provide a cost effective solution to particular computing needs, the lack of legacy features in such systems presents difficulties where execution of applications that perform system diagnostics is concerned. Those difficulties exist because many existing programs for testing PCs are designed to run under DOS and to utilize legacy I/O facilities, but many thin clients do not boot to DOS and do not have legacy I/O ports. Significant time and expense would be required to rewrite existing DOS-based test programs for other OSs. In addition, new system hardware is typically available before any new OS for that hardware, or any new application designed to run under the new OS, has been written. Furthermore, certain low-level diagnostics can only be performed before the operating system is loaded. Therefore, a need exists for technology that allows conventional diagnostic routines to be utilized on systems that lack legacy I/O facilities. In addition, that technology should enable the diagnostic routines to operate effectively while no OS is loaded. Additionally, there exists a need for a way to test thin clients without incurring the delays and expense associated with rewriting existing testing applications for new OSs and without increasing the costs associated with manufacturing the thin clients. The present invention addresses those needs.

SUMMARY OF THE INVENTION

The present invention provides a data processing system with bootcode support for communicating with a noncompliant external device. The data processing system has a motherboard, a non-volatile memory connected to the motherboard, a volatile memory, processing resources, a communications port that utilizes a first communications protocol, and one or more buses interconnecting those components. Startup instructions obtained from the non-volatile memory load a device driver for the external device from the non-volatile memory into the volatile memory. Unlike the communications port, the external device utilizes a second communications protocol. Diagnostic instructions then utilize the device driver to communicate with the external device via the communications port.

In an illustrative embodiment, the communications port is a USB port, the external device is a serial terminal, the device driver is a serial terminal driver, and the diagnostic instructions utilize the serial terminal driver to communicate with the serial terminal via the USB port while no operating system is present in the volatile memory.

All objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use and further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
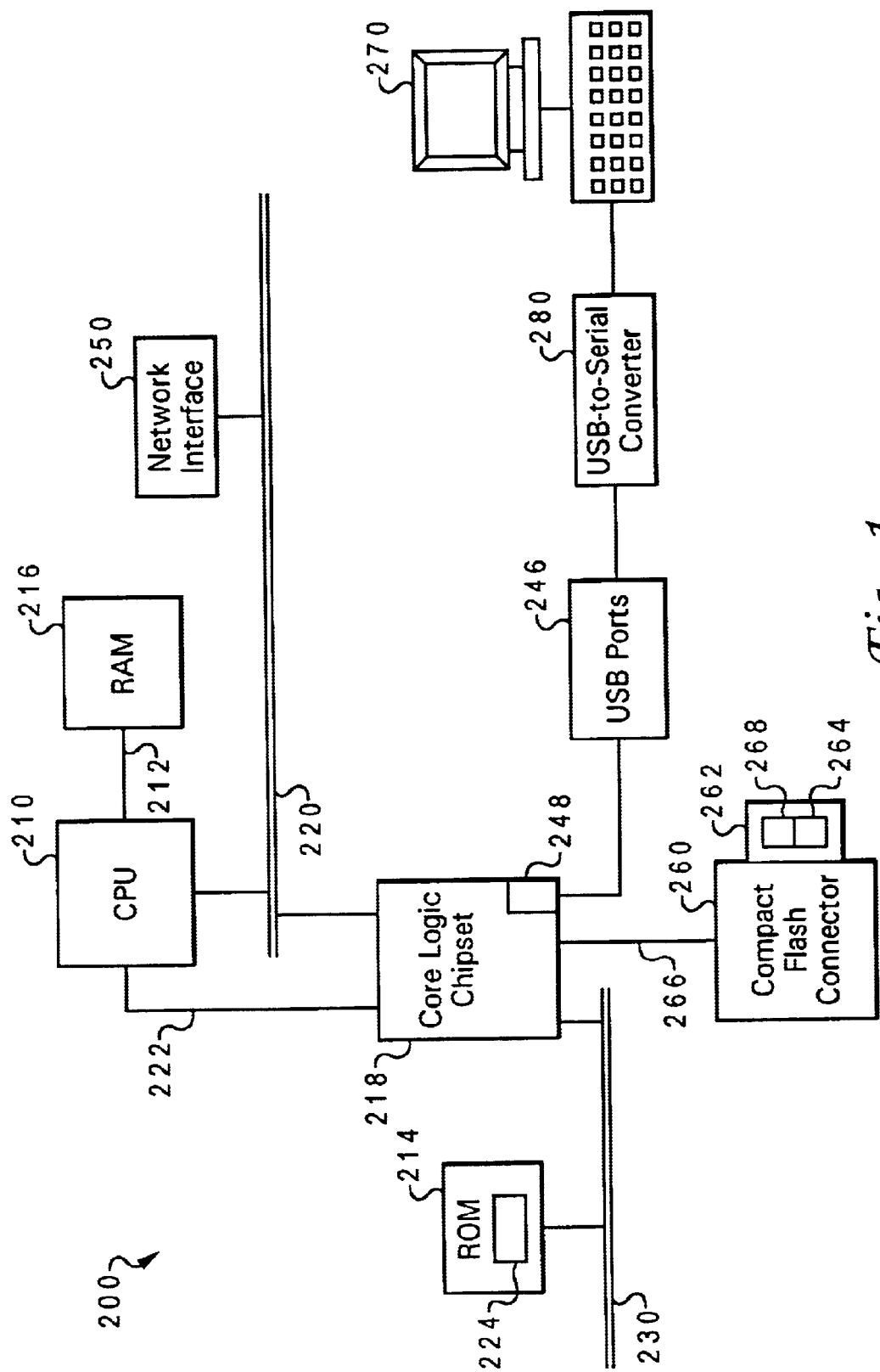
FIG. 1 depicts a block diagram of an illustrative data processing system of the thin client variety, the data processing system including support for interactive diagnostics in accordance with the present invention.

With reference now to the figures, and in particular with reference to FIG. 1, there is depicted a block diagram of a data processing system 200 that supports interactive diagnostics in accordance with the present invention. In particular, data processing system 200 of the illustrative embodiment is designed to be operated as a client workstation within a wide area network (WAN) or LAN that has one or more servers which store and which may execute applications for clients such as data processing system 200. Data processing system 200 is therefore configured as a thin client, omitting many of the components that are usually included in stand-alone systems (such as a hard disk drive), and utilizing a motherboard with onboard subsystems for certain functions that traditionally have been supported by expansion cards.

Nevertheless, as illustrated, data processing system 200 does include a central processing unit (CPU) 210, which is connected to random access memory (RAM) 216 via a memory bus 212. CPU 210 is also connected to a core logic chipset 218 via both a Peripheral Component Interconnect (PCI) local bus 220 and an auxiliary video bus 222. In addition, a read-only memory (ROM) 214 is connected to core logic chipset 218 via an Industry Standard Architecture (ISA) bus 230. Memory bus 212, PCI local bus 220, auxiliary video bus 222, and ISA bus 230 reside within a motherboard (not illustrated). CPU 210, RAM 216, ROM 214, and the various other onboard components are mounted to the motherboard during manufacture or assembly of data processing system 200.

Data processing system 200 may also include a speaker and a display device (not illustrated) for audio and video output, respectively. However, unlike conventional PCs that utilize expansion cards for video and audio output, audio and video output are controlled in data processing system 200 by onboard subsystems of core logic chipset 218. Also included is a network interface 250 for linking data processing system 200 to other stations of a LAN (not illustrated). For example, network interface 250 may be an Ethernet interface for establishing connections to a LAN, an internal modem for establishing dial-up connections to an Internet service provider (ISP), or any comparable communications interface. Preferably, network interface 250 is implemented as an onboard network interface subsystem mounted to the motherboard in communication with PCI bus 220, but alternative configurations (such as an expansion card connected to a PCI or compact PCI expansion slot) are also possible. Data processing system 200 preferably includes no more than one expansion slot, however, as it is desirable to minimize the cost of data processing system 200, as well as its footprint, and the essential onboard components leave very little room for additional expansion slots.

Data processing system 200 is designed to receive operator input from input devices such as a USB keyboard and a USB mouse (not illustrated) via one or more USB ports 246. For example, USB port 246 may be connected to a USB host controller subsystem 248 of core logic chipset 218. However, data processing system 200 has no legacy keyboard port (e.g., a keyboard port conforming to the AT or PS/2 conventions, which include only one data line). Data processing system also has no legacy serial port and no hard disk drive.

Accordingly, before data processing system 200 is delivered to the end user, ROM 214 is populated with a startup program 224 that loads an OS from a remote server after performing standard boot operations, such as executing a built-in self test (BIST) and loading a BIOS. Specifically, in the illustrative embodiment, startup program 224 calls an OS loader that obtains a UNIX-like OS (such as the OS distributed by Liberate Technology under the trademark NCIOS) from a remote server (not illustrated) via network interface 250 and loads that OS into RAM 126. A startup parameter identifying the server is stored in a complementary metal-oxide semiconductor (CMOS) or equivalent memory (not illustrated) of data processing system 200. After the OS is loaded, data processing system 200 obtains and executes client software that further equips data processing system 200 to operate as a network client. That client then retrieves one or more applications (such as word processors, web browsers, etc.) from an application server and/or instructs the application server to execute one or more applications on the client's behalf.

In the illustrative embodiment, data processing system 200 also includes an interface for an auxiliary startup medium, such as a compact flash connector 260 for a compact flash card 262. This interface may be connected to core logic chipset 218 via an Integrated Device Electronics (IDE) bus 266, for example. Data processing system 200 is designed to utilize compact flash card 262 in lieu of ROM 214 as the source for the bootcode if compact flash card 262 is connected to compact flash connector 260 when the system is booted. In the engineering and manufacturing phases of production, this functionality allows engineers to validate and debug the hardware by booting to an auxiliary diagnostic startup program 264 in compact flash card 262 in lieu of, or in the absence of, a standard startup program 224 in ROM 214. As described in greater detail below in conjunction with an illustrative configuration process according to the present invention, the diagnostics are monitored and controlled from a serial terminal 270 that is connected to USB port 246 via a conventional USB-to-Serial adapter 280. Before examining that process, however, it may prove useful to examine more closely a thin client with a conventional configuration.

Figure 2:
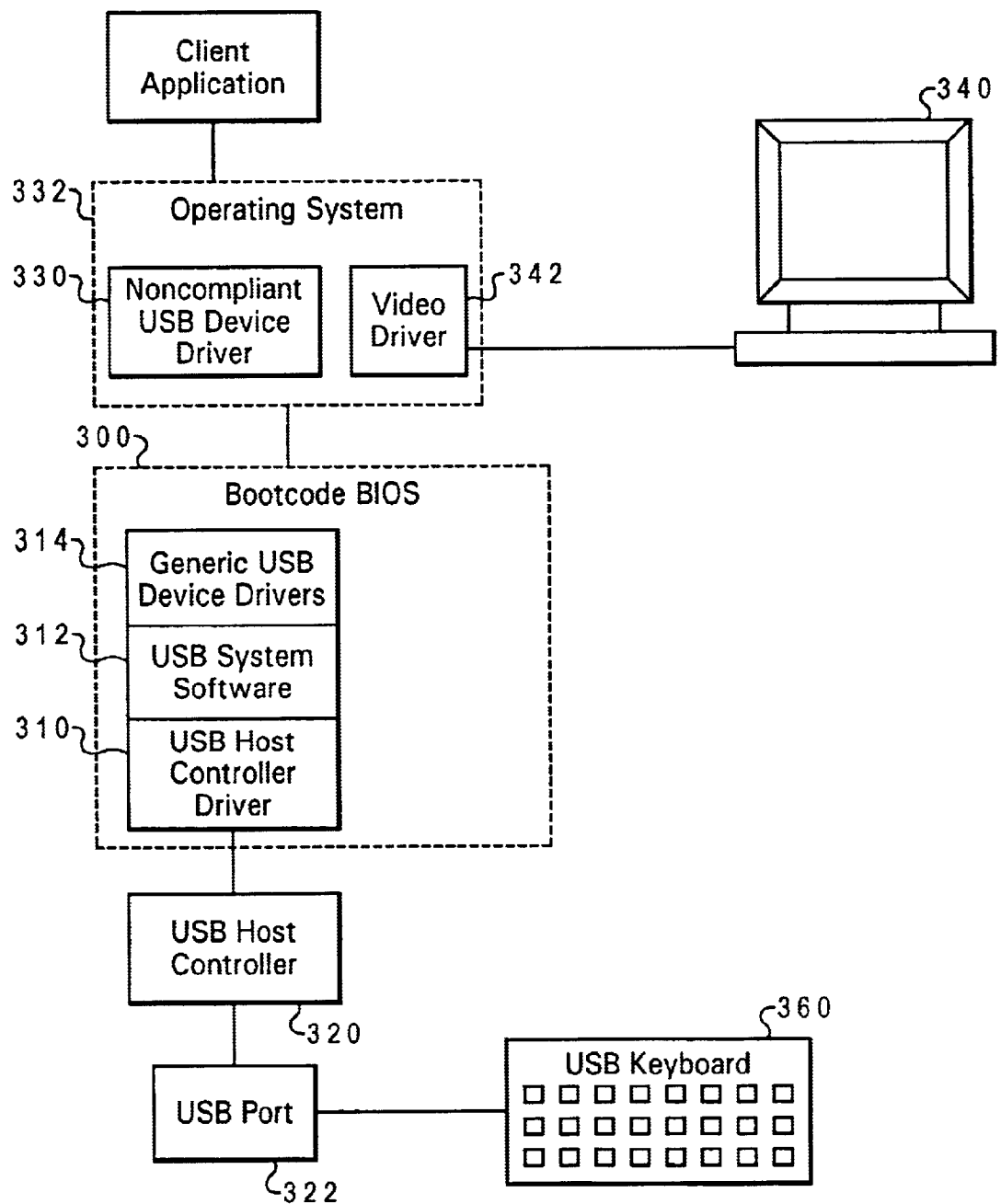
FIG. 2 illustrates a block diagram of conventional hardware and software components that support operator I/O.

Therefore, referring now to FIG. 2, there is illustrated a block diagram of a thin client as configured by conventional bootcode, such as startup program 224. When the thin client is booted, the startup program loads a BIOS 300 into the thin client's RAM, and BIOS 300 includes a USB host controller driver 310 that provides a low-level interface to USB host controller 320 (i.e., the hardware within the thin client that sends and receives data to and from the USB port 322). In addition, the BIOS 300 includes USB system software 312, which provides a mid level interface to USB host controller driver 310. When loaded by the startup program, BIOS 300 may also include generic device drivers 314 for certain USB devices, such as a USB keyboard 360 and/or a USB mouse (not illustrated).

In conventional data processing systems, however, BIOS 300 does not include any USB drivers for any non-USB devices (i.e., BIOS 300 does not include any noncompliant USB drivers). For the purposes of this document, a noncompliant USB driver is defined as the logic within a data processing system that enables programs executing on that data processing system to communicate, via the USB port, with devices (such as serial terminals) that do not utilize the USB communications protocol. Rather, in conventional systems, if communication with a non-USB device via a USB port is desired, an appropriate noncompliant USB device driver 330 is loaded as part of the OS 332, after the startup program has finished loading BIOS 300 and control has passed from the startup program to an OS loader. Also, in conventional systems, video output is normally displayed on a display device 340 under the control of a video driver 342 that also resides within OS 332. Therefore, modern diagnostic programs designed to interact with serial terminals while no operating system is loaded cannot be utilized to test conventional thin clients.

Figure 3:
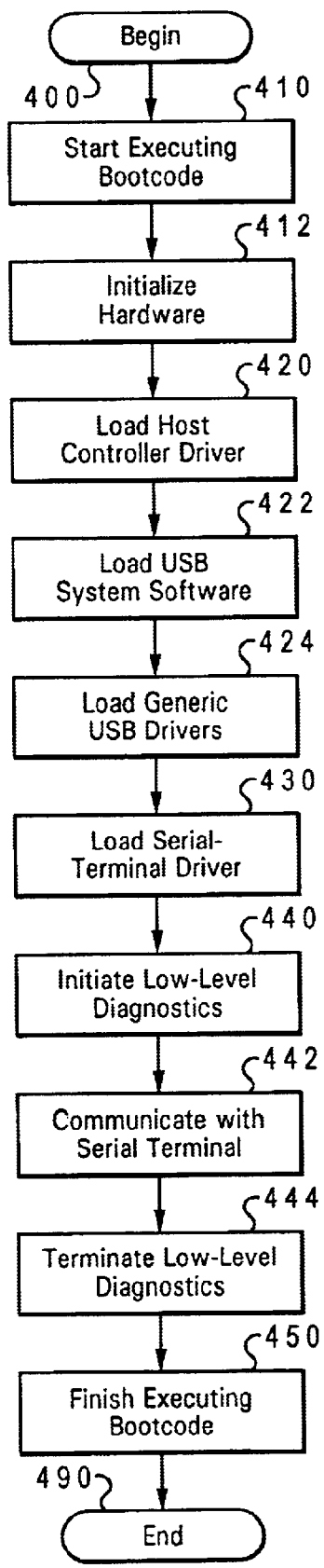
FIG. 3 depicts a flowchart of an exemplary process for performing interactive diagnostics according to the present invention; an FIG. 4 illustrates a block diagram of illustrative hardware and software components that support interactive diagnostics according to the present invention.

With reference now to FIG. 3, there is depicted an illustrative process according to the present invention for configuring data processing system 200 so that diagnostics may be controlled via USB port 246. The process begins at block 400 with data processing system 200 being booted (e.g., being powered up or restarted). The process then passes to block 410, which depicts data processing system 200 beginning the boot sequence by fetching and executing an initial startup instruction from a predetermined memory address. In the illustrative embodiment, that address is mapped to a location in compact flash card 262 that contains the first instruction of diagnostic startup program 264. Diagnostic startup program 264 then causes data processing system 200 to perform a BIST and initialize the hardware, as shown at block 412.

Referring now also to FIG. 4, which illustrates a block diagram of data processing system 200 as configured by the process of FIG. 3, after initializing the hardware, diagnostic startup program 264 begins building a BIOS 500 by loading a host controller driver 510 from compact flash card 262 into RAM 216, as depicted at block 420. USB system software 512 is then added to BIOS 500, and generic USB device drivers may optionally be loaded, as shown at blocks 422 and 424, respectively.

As illustrated at block 430, diagnostic startup program 264 then loads a noncompliant USB device driver from compact flash card 262 into RAM 216. Preferably, the noncompliant USB device driver is a serial terminal driver 520 that is designed to interact with serial terminal 270 via USB host controller 248 and USB port 246. For the purposes of this document, a serial terminal is defined as a device that accepts operator input via a keyboard (or other input tool) and in response transmits data to another device, displays text in response to receiving data from the other device, and utilizes legacy serial port protocols rather than USB protocols to communicate with the other device.

In the illustrative embodiment, serial terminal 270 is a conventional PC utilizing a legacy serial port and a terminal simulation application, such as the application developed for Microsoft Corporation by Hilgraeve Inc. and distributed under the trademark HyperTerminal. USB-to-Serial converter 280 is interposed between the legacy serial port of serial terminal 270 and USB port 246 of data processing system 200. USB-to-Serial converter 280 features a USB port and a legacy serial port and utilizes conventional logic to translate USB signals at the USB port into the conventional serial port data at the serial port, and vice versa.

After serial terminal driver 520 has been loaded, diagnostic startup program 264 initiates execution of a low-level level diagnostic application 268, as depicted at block 440. As illustrated at block 442, low-level diagnostic application 268 then utilizes USB port 260 to receive operator input from, and transmit output to, serial terminal 270 via USB-to-Serial converter 280. Specifically, serial terminal 270 displays text in response to receiving output from low-level diagnostic application 268 and transmits control input to low-level diagnostic application 268 in response to operator manipulation of a keyboard of serial terminal 270. Upon completion of the low-level diagnostics (e.g., in response to operator input requesting termination), execution of the low-level diagnostics ends, as illustrated at block 444.

Diagnostic startup program 264 then finishes executing, as shown at block 450, preferably by transferring control to an OS loader that finally causes the system to load an OS. That OS may be DOS, which may be loaded from compact flash card 262, in which case conventional DOS-based system-test programs can be executed, with serial terminal 270 being utilized to monitor and control those programs. Alternatively, the OS loader can load a different OS from a server to prepare the system for conventional operation, for example by loading a serial terminal driver as part of the OS, as depicted in FIG. 2. The illustrated process then ends, as shown at block 490.

In conclusion, as has been described, the present invention provides a convenient means for utilizing a serial terminal and a USB port to monitor and control low-level diagnostic applications before any OS has been loaded. In addition, the present invention facilitates execution of conventional DOS-based test programs in systems that lack support for legacy features (such as legacy keyboards and serial ports and local, internal hard drives).

While the invention has been described with reference to an illustrative embodiment, this description is not meant to be construed in a limiting sense. For example, although the illustrative embodiment involves a PC with a particular hardware architecture, those of ordinary skill in the art will appreciate that the present invention could as well be utilized to advantage in data processing systems with alternative architectures. Also, although the illustrative embodiment loads the diagnostic bootcode from the compact flash card, that bootcode could alternatively be stored within the onboard ROM with the default startup program. An operator could then cause the diagnostic bootcode to be utilized in lieu of the default startup program, for example by depressing a predetermined key sequence while the system is booting.

Furthermore, additional changes to the form and details of the disclosed embodiments, as well as alternative embodiments of the invention, will become apparent to persons skilled in the art upon reference to the description of the invention. It is therefore contemplated that such modifications can be made without departing from the spirit and scope of the present invention as defined in the appended claims.

What is claimed is:

1. A method in a data processing system for providing bootcode support for communicating with a noncompliant external device, said method comprising:

booting a data processing system having a motherboard, a non-volatile memory connected to said motherboard, a volatile memory, and a communications port that utilizes a first communications protocol;

in response to said booting, loading a device driver for an external device from said non-volatile memory into said volatile memory, wherein said external device utilizes a second communications protocol;

utilizing said device driver to communicate with said external device via said communications port.

2. The method of claim 1, wherein:

said method further comprises beginning to load an operating system into said volatile memory; and said step of utilizing said device driver to communicate with said external device is performed before said step of beginning to load said operating system.

3. The method of claim 1, wherein:

said data processing system includes default bootcode that loads an operating system into said volatile memory and auxiliary bootcode that performs said steps of loading said device driver and utilizing said device driver; and said method further comprises:

determining whether or not to utilize said auxiliary bootcode; and executing said auxiliary bootcode in lieu of said default bootcode in response to a determination to utilize said auxiliary bootcode, such that said device driver is utilized to communicate with said external device while no operating system is present in said volatile memory.

4. The method of claim 3, wherein:

said step of determining whether or not to utilize said auxiliary bootcode comprises determining whether operator input for activating said auxiliary bootcode has been received; and said step of loading said auxiliary bootcode comprises:

loading a BIOS including said device driver from said non-volatile memory into said volatile memory; and loading a diagnostic application from said non-volatile memory into said volatile memory.

5. The method of claim 3, wherein:

said step of determining whether or not to utilize said auxiliary bootcode comprises determining whether an auxiliary non-volatile memory is connected to said motherboard; and said step of loading said auxiliary bootcode comprises:

in response to determine that an auxiliary non-volatile memory is connected to said motherboard, loading a BIOS including said device driver from said auxiliary non-volatile memory into said volatile memory; and loading a diagnostic application from said auxiliary non-volatile memory into said volatile memory.

6. The method of claim 3, wherein:

said first protocol uses first and second data lines that carry data as complementary voltage signals;

said second protocol uses at least one data line that carries data independently of any other data line; and said step of utilizing said device driver to communicate with said external device comprises converting said output from said first protocol to said second protocol.

7. The method of claim 3, wherein:

said external device comprises a serial terminal and said device driver comprises a serial terminal driver;

said method further comprises generating input signals in response to operator manipulation of said serial terminal; and said step of step of utilizing said device driver to communicate with said external device comprises accepting said input signals from said serial terminal as control signals, such that low-level testing of said data processing system may be controlled via said communications port.

8. The method of claim 3, wherein:

said communications port comprises a Universal Serial Bus (USB) port; and said method further comprises:

receiving output from said communications port at a USB-to-Serial adapter interposed between said communications port and said external device;

converting said output from said first protocol to said second protocol; and utilizing said second protocol to transmit said output from said USB-to-Serial adapter to said external device.

9. A data processing system with bootcode support for communicating with a noncompliant external device , said data processing system comprising:

a motherboard, a non-volatile memory connected to said motherboard, a volatile memory, processing resources, a communications port that utilizes a first communications protocol, and one or more buses interconnecting said non-volatile memory, said volatile memory, said processing resources, and said communications port;

startup instructions that load a device driver for an external device from said non-volatile memory into said volatile memory, wherein said external device utilizes a second communications protocol; and a diagnostic application that utilizes said device driver to communicate with said external device via said communications port.

10. The data processing system of claim 9, wherein said device driver enables said diagnostic application to communicate with said external device while no operating system is present in said volatile memory.

11. The data processing system of claim 9, wherein:

said data processing system includes default bootcode that loads an operating system into said volatile memory;

said startup instructions comprise auxiliary bootcode that loads said device driver and activates said diagnostic application;

said startup instructions include logic for determining whether or not to utilize said auxiliary bootcode; and responsive to a determination to utilize said auxiliary bootcode, said startup instructions execute said auxiliary bootcode in lieu of said default bootcode, such that said diagnostic application utilizes said device driver to communicate with said external device while no operating system is present in said volatile memory.

12. The data processing system of claim 11, wherein:

said logic determines whether or not to utilize said auxiliary bootcode by determining whether operator input for activating said auxiliary bootcode has been received;

said startup instructions load said device driver by loading a BIOS including said device driver from said non-volatile memory into said volatile memory; and said startup instructions load said diagnostic application into said volatile memory by obtaining said diagnostic application from said non-volatile memory.

13. The data processing system of claim 11, wherein:

said logic determines whether or not to utilize said auxiliary bootcode by determining whether an auxiliary non-volatile memory is connected to said motherboard;

in response to determining that an auxilury non-volatile memory is connected to said motherboard, said startup instructions load said device driver by loading a BIOS including said device driver from said auxiliary non-volatile memory into said volatile memory; and said startup instructions load said diagnostic application into said volatile memory by obtaining said diagnostic application from said auxiliary non-volatile memory.

14. The data processing system of claim 11, wherein:

said first protocol uses first and second data lines that carry data as complementary voltage signals;

said second protocol uses at least one data line that carries data independently of any other data line; and said diagnostic application communicates with said external device via a converter that converts communications from said first protocol to said second protocol.

15. The data processing system of claim 11, wherein:

said external device comprises a serial terminal and said device driver comprises a serial terminal driver;

said serial terminal responds to operator manipulation by generating input signals; and said diagnostic application accepts said input signals as control signals, such that low-level testing of said data processing system may be controlled via said communications port.

16. The data processing system of claim 11, wherein:

said communications port comprises a Universal Serial Bus (USB) port;

said data processing system comprises a USB-to-Serial adapter interposed between said USB port and said external device; and said diagnostic application communicates with said external device via said USB port and said USB-to-Serial adapter.

17. A computer program product in a computer-readable medium for providing bootcode support for communicating with a noncompliant external device, said computer program product comprising:

a computer-readable medium;

instructions on the computer-readable medium for booting a data processing system having a motherboard, a non-volatile memory connected to said motherboard, a volatile memory, and a communications port that utilizes a first communications protocol;

instructions on the computer-readable medium for, in response to said booting, loading a device driver for an external device from said non-volatile memory into said volatile memory, wherein said external device utilizes a second communications protocol;

instructions on the computer-readable medium for utilizing said device driver to communicate with said external device via said communications port.

18. The computer program product of claim 17, wherein:

said instructions on the computer-readable medium further comprise instructions for beginning to load an operating system into said volatile memory; and said utilizing instructions further comprise instructions on the computer-readable medium for utilizing said device driver to communicate with said external device is performed before said step of beginning to load said operating system.

19. The computer program product of claim 17, wherein:

said instruction on said computer readable medium for a booting said data processing system further comprise default bootcode that loads an operating system into said volatile memory and auxiliary bootcode that performs said steps of loading said device driver and utilizing said device driver; and said instructions on the computer-readable medium further comprise instructions for:

determining whether or not to utilize said auxiliary bootcode; and executing said auxiliary bootcode in lieu of said default bootcode in response to a determination to utilize said auxiliary bootcode, such that said device driver is utilized to communicate with said external device while no operating system is present in said volatile memory.

20. The computer program product of claim 19, wherein:

said determining instructions further comprise instructions on the computer-readable medium for determining whether or not to utilize said auxiliary bootcode including instructions for determining whether operator input for activating said auxiliary bootcode has been received; and said loading instructions further comprise instructions on the computer-readable medium for loading said auxiliary bootcode, which comprise:

instructions on the computer-readable medium for loading a BIOS including said device driver from said non-volatile memory into said volatile memory; and said loading instructions further comprise instructions on the computer-readable medium for loading a diagnostic application from said non-volatile memory into said volatile memory.

21. The computer program product of claim 19, wherein:

said determining instructions further comprise instructions on the computer-readable medium for determining whether or not to utilize said auxiliary bootcode by determining whether an auxiliary non-volatile memory is connected to said motherboard; and said loading instructions further comprise instructions on the computer-readable medium for loading said auxiliary bootcode, which further comprise:

in response to detenning that an auxiliary non-volatile memory is connected to said motherboard, loading a BIOS including said device driver from said auxiliary non-volatile memory into said volatile memory; and loading a diagnostic application from said auxiliary non-volatile memory into said volatile memory.

22. The computer program product of claim 19, wherein:

said instructions on said computer readable medium further comprise instructions to accommodate an environment wherein said first protocol uses first and second data lines that carry data as complementary voltage signals;

said second protocol uses at least one data line that carries data independently of any other data line; and said utilizing instructions further comprise instructions on the computer-readable medium for utilizing said device driver to communicate with said external device comprises converting said output from said first protocol to said second protocol.

23. The computer program product of claim 19, wherein:

said instructions on said computer readable medium further comprise instructions to accommodate an environment wherein said external device comprises a serial terminal and said device driver comprises a serial terminal driver;

said instructions on the computer-readable medium further comprise generating input signals in response to operator manipulation of said serial terminal; and said utilizing instructions further comprise instructions on the computer-readable medium for utilizing said device driver to communicate with said external device comprises accepting said input signals from said serial terminal as control signals, such that low-level testing of said data processing system may be controlled via said communications port.

24. The computer program product of claim 19, wherein:

said instructions on said computer readable medium further comprise instructions to accommodate an environment wherein said communications port comprises a Universal Serial Bus (USB) port; and wherein said instructions on the computer-readable medium further comprises:

instructions for receiving output from said communications port at a USB-to-Serial adapter interposed between said communications port and said external device;

instructions for converting said output from said first protocol to said second protocol; and instructions for utilizing said second protocol to transmit said output from said USB-to-Serial adapter to said external device.

* * * * *